(12) United States Patent
Schliwa et al.

(10) Patent No.: US 8,672,267 B2
(45) Date of Patent: Mar. 18, 2014

(54) TOILET ARRANGEMENT FOR A VEHICLE

(75) Inventors: Ralf Schliwa, Dollern (DE); Andreas Barber, Kakenstorf (DE); Maria Strasdas, Jork (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/588,154

(22) Filed: Aug. 17, 2012

(65) Prior Publication Data
US 2013/0001359 A1    Jan. 3, 2013

Related U.S. Application Data

(63) Continuation of application No. PCT/EP2011/052307, filed on Feb. 16, 2011.

(60) Provisional application No. 61/306,213, filed on Feb. 19, 2010.

(30) Foreign Application Priority Data

Feb. 19, 2010  (DE) .......................... 10 2010 008 625

(51) Int. Cl.
B64D 11/02    (2006.01)

(52) U.S. Cl.
USPC ................... 244/118.6; 244/118.5; 244/129.1

(58) Field of Classification Search
USPC .......... 244/118.5, 118.6, 129.1, 129.4, 129.5; 4/663, 664
See application file for complete search history.

(56) References Cited

U.S. PATENT DOCUMENTS

| | | | |
|---|---|---|---|
| 4,055,317 A | 10/1977 | Greiss | |
| 5,474,260 A | 12/1995 | Schwertfeger et al. | |
| 6,079,669 A | 6/2000 | Hanay et al. | |
| 8,136,763 B2 | 3/2012 | Saint-Jalmes et al. | |
| 2002/0062521 A1 | 5/2002 | Itakura | |
| 2003/0155466 A1* | 8/2003 | Wentland et al. | .......... 244/118.5 |
| 2004/0163170 A1 | 8/2004 | Cooper et al. | |
| 2005/0125891 A1* | 6/2005 | Stratmann | ........................ 4/661 |
| 2005/0241062 A1 | 11/2005 | Quan | |
| 2009/0065641 A1 | 3/2009 | Koehn et al. | |
| 2009/0261200 A1 | 10/2009 | Saint-Jalmes et al. | |
| 2013/0001359 A1 | 1/2013 | Schliwa et al. | |

FOREIGN PATENT DOCUMENTS

| | | |
|---|---|---|
| DE | 4300877 A1 | 7/1994 |
| DE | 4336418 A1 | 4/1995 |
| DE | 10204343 A1 | 8/2003 |
| EP | 0170116 A1 | 2/1986 |
| EP | 1209078 A2 | 5/2002 |
| EP | 0867365 A2 | 8/2003 |
| EP | 1338508 A2 | 8/2003 |
| FR | 2910436 A1 | 6/2008 |

(Continued)

*Primary Examiner* — Timothy D Collins
*Assistant Examiner* — Nicholas McFall
(74) *Attorney, Agent, or Firm* — Lerner, David, Littenberg, Krumholz & Mentlik, LLP

(57) ABSTRACT

A toilet arrangement for a vehicle includes a first toilet compartment, an adjacent second toilet compartment and a partition wall situated between the first toilet compartment and the second toilet compartment, wherein the partition wall is movably supported and designed for being transferred into an open position, in which the partition between the first toilet compartment and the second toilet compartment is removed. This makes it possible to convert two relatively small toilet compartments into a larger toilet compartment that is suitable for use by persons with limited mobility.

9 Claims, 6 Drawing Sheets

(56) References Cited

FOREIGN PATENT DOCUMENTS

| | | | |
|---|---|---|---|
| JP | 05163758 A | 6/1993 | |
| WO | 2004076281 A1 | 9/2004 | |
| WO | 2008102070 A1 | 8/2008 | |
| WO | 2008139212 A1 | 11/2008 | |
| WO | 2011101385 A2 | 8/2011 | |

* cited by examiner

TOILET ARRANGEMENT FOR A VEHICLE

CROSS-REFERENCE TO RELATED APPLICATIONS

The present application is a continuation of International Application No. PCT/EP2011/052307, filed Feb. 16, 2011, published in German, which claims priority from U.S. Provisional Patent Application No. 61/306,213, filed Feb. 19, 2010 and German Patent Application No. 10 2010 008 625.8, filed Feb. 19, 2010, the disclosures of which are incorporated herein by reference.

TECHNICAL FIELD

The invention relates to a toilet arrangement for a vehicle. The invention specifically relates to a toilet arrangement for an aircraft, the use of such a toilet arrangement in an aircraft, as well as an aircraft with such a toilet arrangement.

BACKGROUND OF THE INVENTION

In the layout of passenger cabins in vehicles, one important objective frequently is the maximization of the available number of passenger seats that is limited by the number of mandatory seats for crew members, as well as mandatory safety devices, arbitrary service equipment and toilets. The proportion of the number of passenger seats to the remaining equipment in passenger cabins is a factor that co-determines the operating efficiency of an aircraft in scheduled air traffic. In addition to official regulations for the type certification and the operating permit of vehicles, the operators of the vehicles also need to take into account customer's needs such as, for example, customized special installations in the selection of seat sizes, seat spacings, service equipment and toilets. Depending on the design of fixtures in the passenger cabin and their space requirement, intelligent construction and configuration solutions can optimize the number of passenger seats.

For space reasons and lack of ulterior regulations, certain vehicles according to the prior art merely comprise standard toilets, but no separate toilets for persons with limited mobility. For example, it should be possible to enter such toilets that are also referred to as "handicapped toilets" below with a wheelchair. Handicapped toilets of this type require much more installation space and are scarce, particularly in aircraft, because they significantly reduce the operating efficiency of the aircraft in question and are only used very infrequently.

DE 43 00 877 A1 and U.S. Pat. No. 5,474,260 describe an aircraft with a series of service equipment and toilets that are designed in the form of independent conventional toilet compartments.

BRIEF SUMMARY OF THE INVENTION

An aspect of the present invention provides a toilet arrangement for a vehicle that can be used by persons with limited mobility, but does not excessively restrict the operating efficiency of the vehicle.

The described exemplary embodiments likewise concern the toilet arrangement, the use and the aircraft. In other words, all characteristics mentioned below, for example, with reference to the toilet arrangement can also be implemented for the use or in the aircraft and vice versa.

According to an embodiment of the invention, a toilet arrangement for a vehicle is disclosed that comprises a first toilet compartment, an adjacent second toilet compartment and a partition wall situated between the first toilet compartment and the second toilet compartment. The partition wall is movably supported and designed for being transferred into an open position, in which the partition between the first toilet compartment and the second toilet compartment is removed.

In other words, this means that the toilet arrangement according to the invention consists of two adjacent toilet compartments that, due to the movement into an open position, form a single, significantly larger "common" toilet compartment that can be accessed with a wheelchair and the size of which suffices for temporarily storing the wheelchair on a walk-in surface of one of the two originally independent toilet compartments. The common toilet compartment is simultaneously dimensioned such that it is even possible for a second person to assist a person with limited mobility in the common toilet compartment, for example, during the transfer from a wheelchair onto a toilet seat. The particular advantages of the toilet arrangement according to an embodiment of the present invention can be seen in combining two independent toilet compartments into one common toilet compartment with simple manipulations such that a handicapped toilet can be created only in case of need without requiring additional installation space within the cabin of the vehicle and the operating efficiency of the vehicle is not adversely affected at all.

The movement of the partition wall may be realized in any suitable way, e.g., by means of folding, pivoting, sliding or the like. The partition wall may furthermore be realized in the form of a shutter door and horizontally or vertically rolled up and unrolled on demand.

According to another embodiment of the invention, the partition wall comprises at least one locking mechanism that locks the partition wall in at least one open position and at least one closed position by actuating an operating means. This simplifies the conversion of the two toilet compartments because the partition wall is positioned at a defined location and cannot be disengaged from the intended position due to vibrations or the like. This also simplifies the use of the toilet arrangement according to the invention because the partition wall cannot suddenly move into the middle of the common toilet compartment due to vibrations and become jammed, e.g., with a wheelchair.

An advantageous locking mechanism may extend over the entire compartment height of the cabin of the vehicle such that the partition wall is fixed on the floor of the cabin, as well as on the ceiling of the cabin. It would be practical to arrange an operating means on the partition wall at waist level, wherein a linear motion transfer means such as, e.g., a Bowden wire, a push rod, a cable or the like respectively extends from said operating means to the floor and/or the ceiling of the cabin. Tappets or pins may be engaged into or disengaged from openings in the floor and/or the ceiling of the cabin due to an actuation of the operating means. The locking and unlocking of the door and partition wall elements may likewise be realized electrically, hydraulically, pneumatically or in another automated fashion. Consequently, authorized personnel may disengage the locking mechanism without an additional tool, for example, by actuating a switch outside the toilet compartments that is not accessible to passengers in order to realize the conversion.

At this point, it should be noted that the locking mechanism of the partition wall should, if possible, only be moved by one crew member of the vehicle such that an inadvertent operation from one of the two toilet compartments can be precluded and the privacy of a user of the adjacent toilet compartment can be ensured. In this respect, it would be possible to utilize a lock or another operating means that can only be actuated with a special key or another special tool such as, e.g., a triangular profile or the like.

According to another embodiment of the invention, the partition wall is composed of two individual partition wall segments, both of which are movably supported individually and separately of one another. This partition wall may be realized, for example, similar to a double-wing door such that both partition wall segments can be pivoted open in different directions.

According to another embodiment of the invention, a first partition wall segment is designed for being pivoted from a position between the first toilet compartment and the second toilet compartment against a first side wall of the first or the second toilet compartment while the second partition wall segment is designed for being pivoted into an area that neither lies in the first toilet compartment nor in the second toilet compartment. After entering the common toilet compartment, the second partition wall segment can be once again pivoted back to the common toilet compartment in order to be used, for example, as a door or shutter of the toilet arrangement according to the invention.

According to another embodiment of the toilet arrangement according to the invention, the axis of the first toilet compartment and the axis of the second toilet compartment essentially extend perpendicular to one another. This means that the first toilet compartment and the second toilet compartment form the shape of an L that is particularly advantageous with respect to the division of the partition wall into two partition wall segments.

According to another embodiment of the present invention, the first toilet compartment comprises a first toilet compartment door that can be pivoted about a first door hinge axis, wherein this first door hinge axis is spaced apart from the second toilet compartment. In this way, the first toilet compartment door can be pivoted parallel to the direction, in which the second toilet compartment extends, and at a distance from the second toilet compartment in order to be used as a lateral surface of an entrance area of a common toilet compartment at this location.

According to another embodiment of the invention, the partition wall segments are pivotably supported. The second partition wall segment is designed for being connected to the first toilet compartment door or for being locked thereon such that the combination of the first toilet compartment door and the second partition wall segment forms a new entrance area of a common toilet compartment. Since the first toilet compartment door, as well as the second partition wall segment, is positioned outside the first and the second toilet compartment, a larger surface than that of both separate toilet compartments combined can be realized for the common toilet compartment without requiring additional installation space.

According to another embodiment of the invention, a cabin monument is arranged on the distant end of the first toilet compartment referred to the second toilet compartment. Remaining installation space, for example, in the tail of the vehicle can be used for achieving the most compact integration possible of different functions, particularly if the two toilet compartments are positioned relative to one another in the form of an L-shaped arrangement.

According to another embodiment of the invention, this additional monument is a galley.

According to another embodiment, the additional monument is a third toilet compartment. The toilet arrangement according to the invention may, in principle, be equipped with assistive equipment such as handles, brackets and the like that enable a person with limited mobility to safely and independently move therein.

In addition to the use, an aircraft comprising at least one passenger cabin and at least one toilet arrangement according to an embodiment of the invention is also proposed. The toilet arrangement according to an embodiment of the invention may preferably be arranged in the tail of a fuselage that, in case of an actively pressurized aircraft fuselage, usually has a concave pressure bulkhead viewed from the fuselage. Due to the concave shape, additional installation space is made available and used by the toilet arrangement according to an embodiment of the invention, e.g., for the integration of handwash basins or the like.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
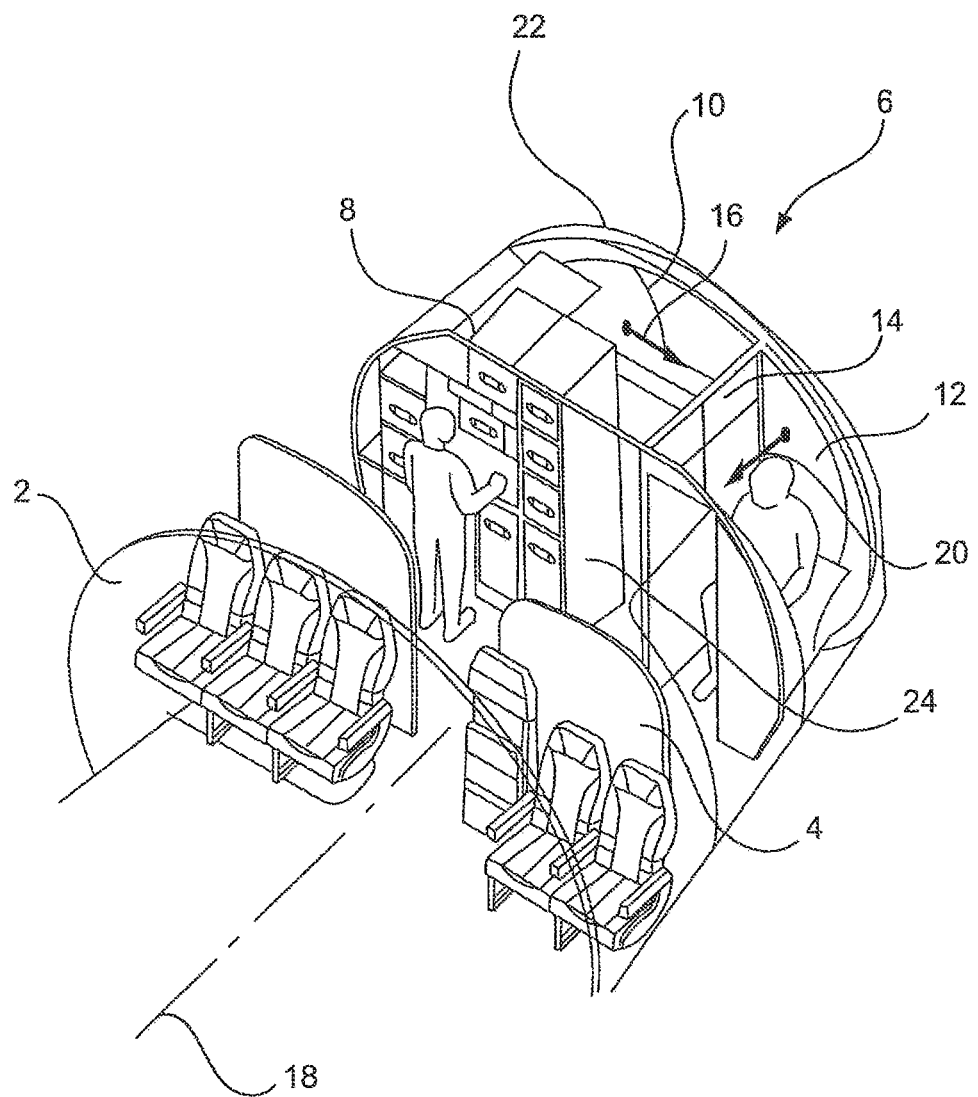
FIG. 1 shows a tail section of an aircraft cabin with a toilet arrangement according to an embodiment of the invention.

FIG. 1 shows a last row of seats and adjacent partitions 4 in a tail section of a passenger cabin 2 of an aircraft, wherein a toilet arrangement 6 according to an embodiment of the invention and another monument 8 are arranged behind said partitions. The toilet arrangement 6 according to an embodiment of the invention comprises a first toilet compartment 10, an independent second toilet compartment 12 and a partition wall 14 that lies between the two toilet compartments.

The first toilet compartment 10 extends in a direction 16 that is aligned perpendicular to a longitudinal axis 18 of the aircraft fuselage 2. The second toilet compartment 12 extends in a direction 20 that is essentially aligned parallel to the longitudinal axis 18 of the aircraft fuselage 2. This means that the first toilet compartment 10 and the second toilet compartment 12 extend in directions 16 and 20 that are aligned perpendicular to one another and therefore form the shape of an L in the exemplary illustration shown.

In the exemplary embodiment shown, the toilet arrangement 6 according to an embodiment of the invention is arranged in a tail area of the passenger cabin 2 in such a way that the conventional pressure bulkhead 22 of the passenger cabin 2 for an actively pressurized aircraft fuselage 2 serves as outermost end wall. Additional installation space or moving space for persons and additional floor space is made available due to the concave shape such that the toilet arrangement 6 according to an embodiment of the invention can be realized in an exceptionally compact fashion.

The outward boundary of the second toilet compartment 12 is formed, for example, by a fuselage wall on the port side and the first toilet compartment 10 flushly adjoins the second toilet compartment 12. At the illustrated size of the aircraft fuselage, this means that additional installation space for the monument 8 is made available on the distant end of the first toilet compartment 10 referred to the second toilet compartment 12 such that the tail section of the passenger cabin 2 can be utilized in a particularly efficient fashion. In the example shown, the additional monument 8 is realized in the form of a galley, the size of which in the lateral direction of the cabin is adapted to the size of the first toilet compartment door 24 in order to allow the unrestricted use thereof.

The convertibility of the toilet arrangement 6 according to an embodiment of the invention is described in greater detail below with reference to FIGS. 2a to 2f. These figures show the arrangement according to FIG. 1, but without a person situated therein in order to simplify matters and from a slightly different viewing angle. The two toilet compartments of the toilet arrangement according to an embodiment of the invention can be converted into an enlarged toilet compartment in-flight with only a few manipulations and preferably without the assistance of tools, the addition or removal of components and without restrictions, preferably by a member of the flight crew. After this enlarged toilet compartment has been used, the toilet arrangement according to an embodiment of the invention can be once again converted back into two separate toilet compartments.

Figure 2A:
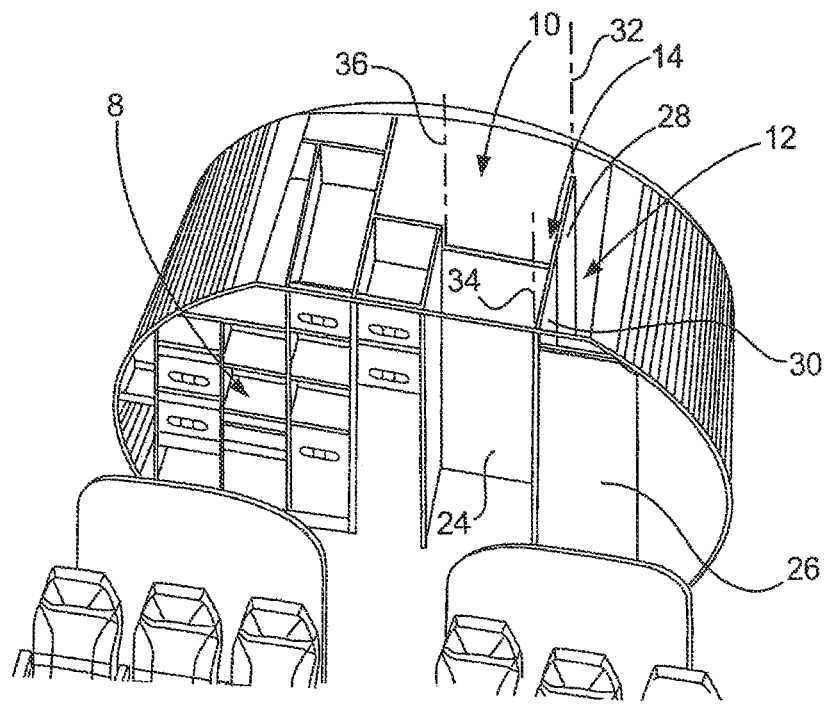
FIGS. 2a-2f show a tail section of an aircraft cabin with a toilet arrangement according to an embodiment of the invention during a conversion of two separate toilet compartments into a common toilet compartment.

In FIG. 2a, the first toilet compartment 10 is initially closed by means of the first toilet compartment door 24. The second toilet compartment 12 is also closed by means of a second toilet compartment door 26. A partition wall 14 is situated between the toilet compartments 10 and 12 and composed of a first partition wall segment 28 and a second partition wall segment 30. In the example shown, the first partition wall segment 28 is supported on a hinge axis 32 and the second partition wall segment 30 is supported on a hinge axis 34. The two hinge axes 32 and 34 are spaced apart from one another in the example shown such that the partition wall 14 is realized as a double-wing or double door of sorts and the area situated between the two hinge axes 32 and 34 forms the boundary in the longitudinal direction of the second toilet compartment 12.

Figure 2B:
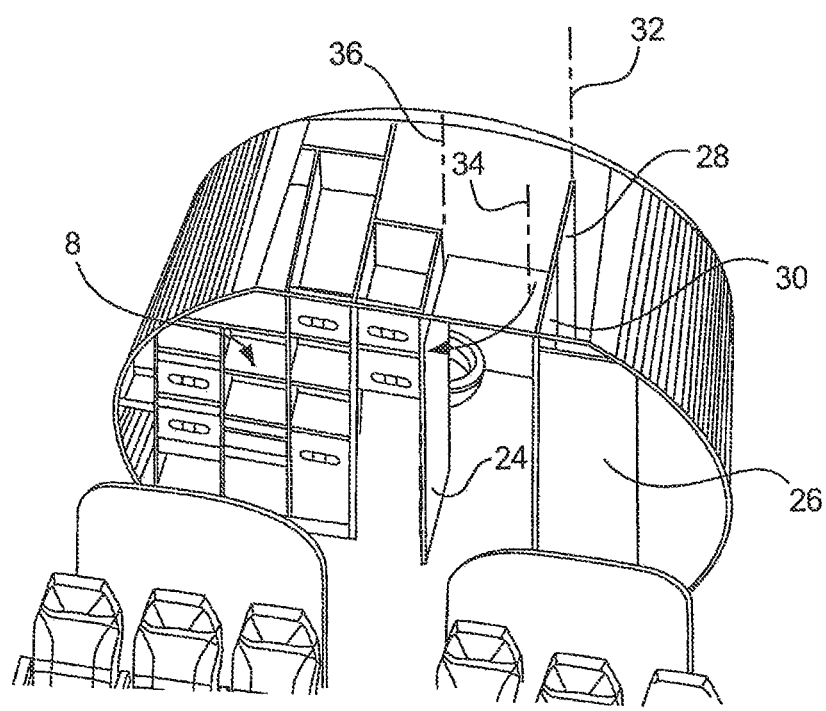

In order to connect the two toilet compartments 10 and 12 into a common toilet compartment, the first toilet compartment door 24 initially is outwardly opened away from the two toilet compartments 10 and 12 as indicated with an arrow in FIG. 2b. This is realized in the form of a pivoting motion of the first toilet compartment door 24 about a hinge axis 36 that is arranged on a boundary wall of the first toilet compartment 10.

Figure 2C:
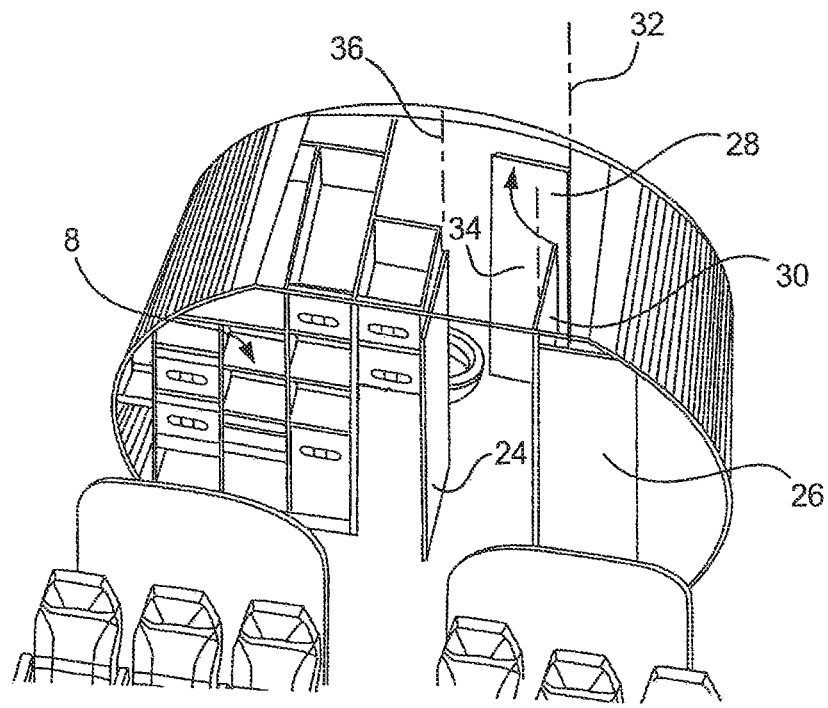

Subsequently, the first partition wall segment 28 is pivoted toward the pressure bulkhead 22 about the hinge axis 32 as illustrated in FIG. 2c after it was correspondingly unlocked from the cabin floor and/or the cabin ceiling and/or the second partition wall segment 30 such that an opening is created between the first toilet compartment 10 and the second toilet compartment 12. Once this position is reached, it is particularly advantageous to lock and thusly fix the position of the first partition wall segment 28 until it is unlocked again.

Figure 2D:
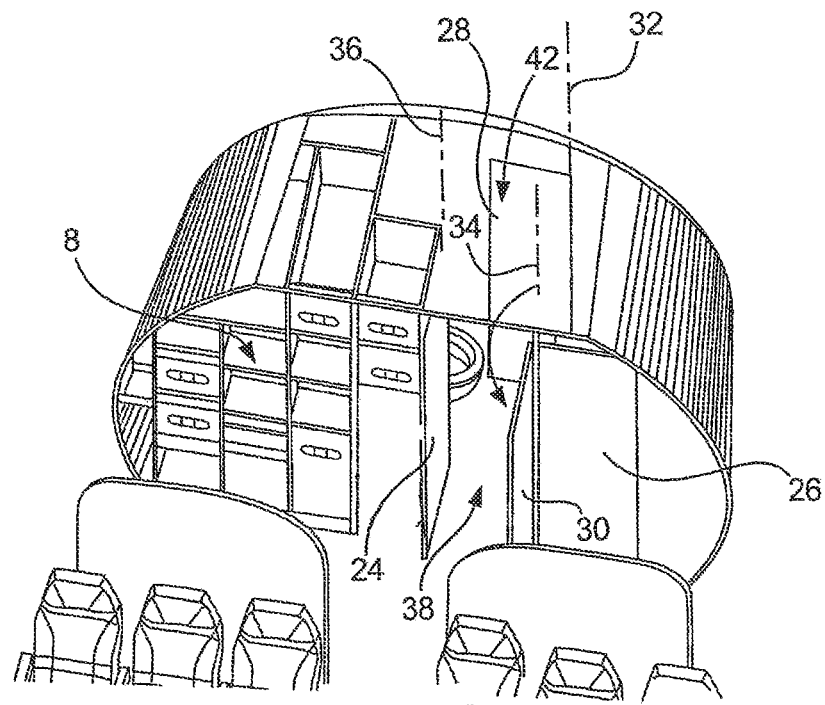
Figure 2E:
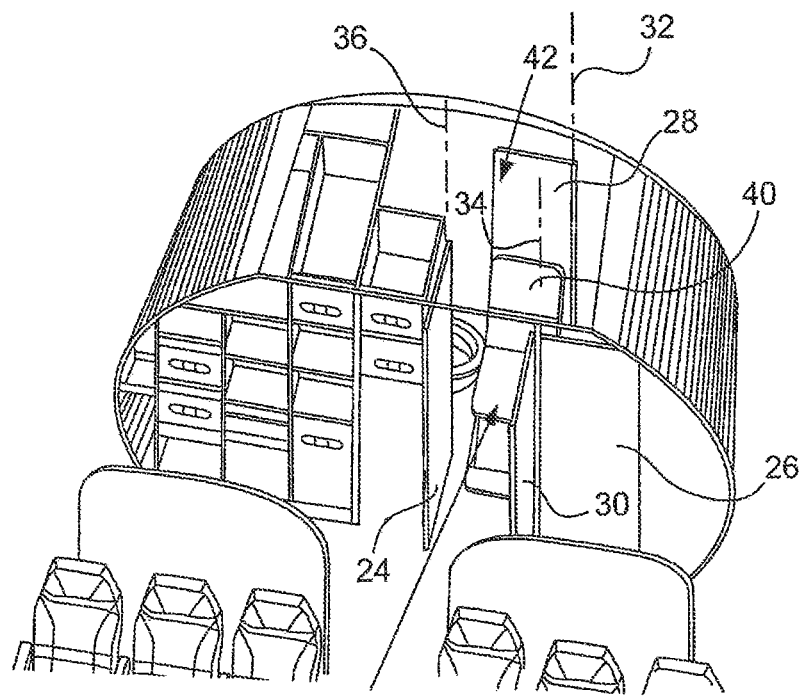

In another step, the second partition wall segment 30 is pivoted outward about the hinge axis 34 by roughly 180° as illustrated in FIG. 2d after it was unlocked from the cabin floor and/or the cabin ceiling such that the first toilet compartment 10 and the second toilet compartment 12 are completely connected to one another. In this position, an opening 38 is created, through which a wheelchair 40 can be effortlessly moved into the now common toilet compartment 42.

The common toilet compartment 42 is closed by subsequently pivoting the second partition wall segment 30 toward the opening 38 about the hinge axis 34. The second partition wall segment 30 is accordingly used as new entrance door to the common toilet compartment 42. In this arrangement, the first toilet compartment door 24 furthermore forms a side wall of the entrance area to the common toilet compartment 42 that is arranged parallel to the direction 20, in which the second toilet compartment 12 extends, and spaced apart from the second toilet compartment 12.

The common toilet compartment 42 now provides sufficient space for a person to transfer from the wheelchair 40 onto a toilet seat or the like. The common toilet compartment 42 can be once again converted back into two separate toilet compartments 10 and 12 on demand.

Figure 2F:
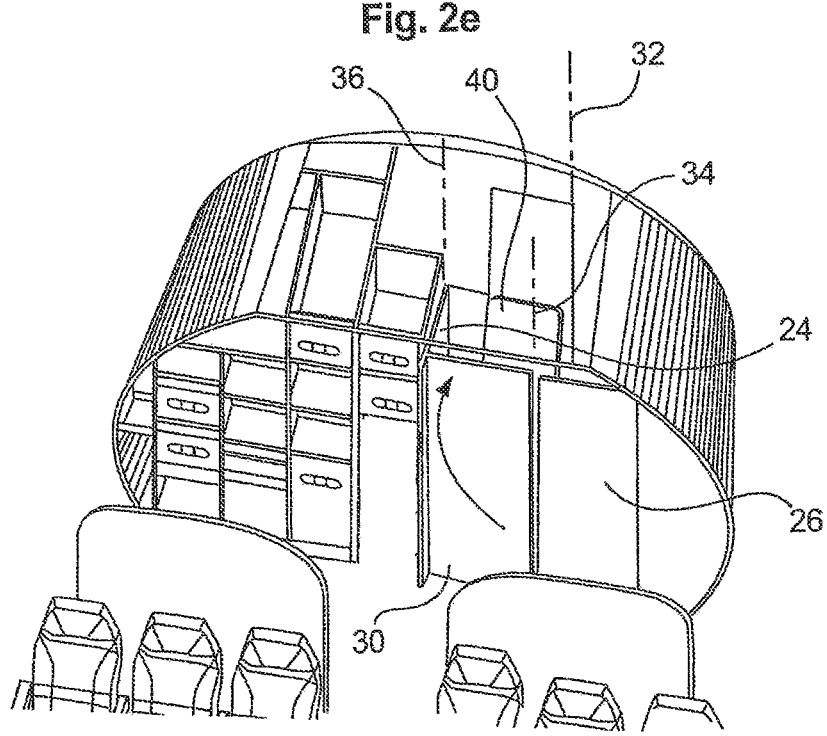

For a person skilled in the art, it goes without saying that the partition wall segments 28 and 30 and the first toilet door 24 are equipped with at least one locking mechanism such that these elements can be locked in the different positions illustrated in FIGS. 1 to 2f.

It should also be ensured that the second toilet compartment door 26 is locked from inside after a conversion into a larger toilet compartment in order to prevent access by third persons. However, a member of the flight crew should be able to unlock the second toilet compartment door 26 from outside on demand in case assistance is needed.

Figure 3:
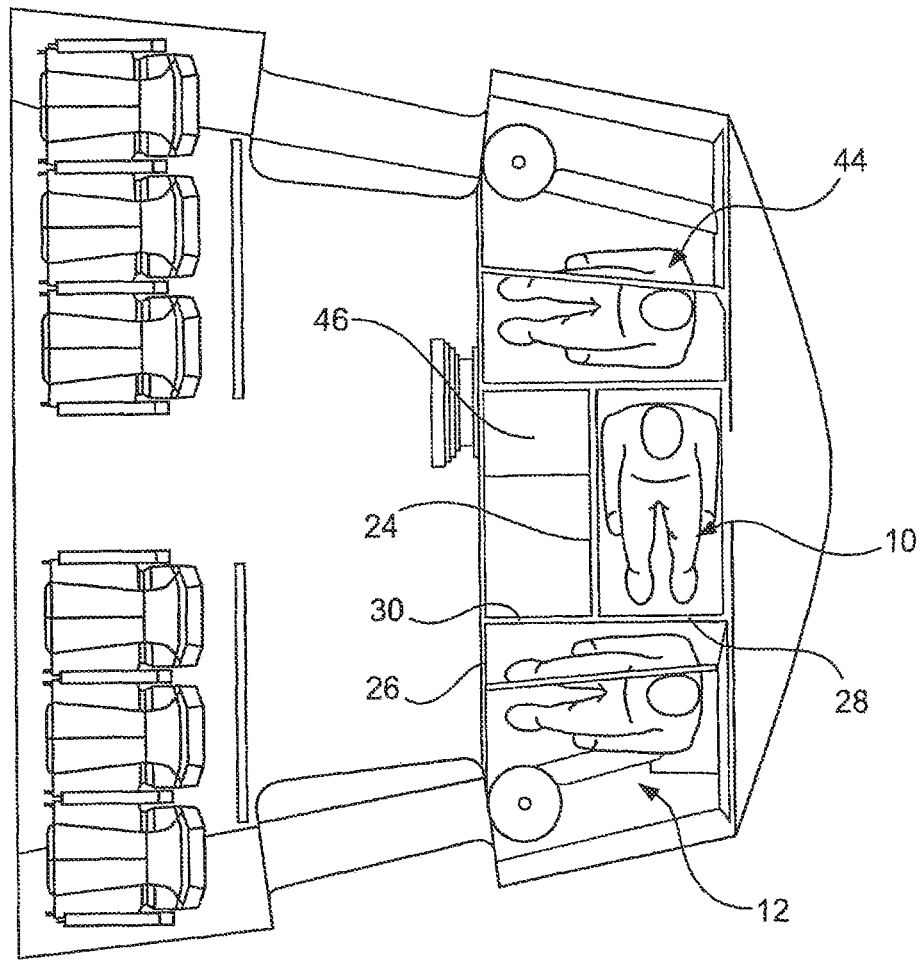
FIG. 3 shows a modification of a toilet arrangement according to an embodiment of the invention.

According to FIG. 3, an additional third toilet compartment 44 may be arranged behind the first toilet compartment 10 on a distant side referred to the second toilet compartment 12 as additional monument of the toilet arrangement 6 according to an embodiment of the invention in order to realize a very compact toilet arrangement according to an embodiment of the invention that requires little installation space.

In addition, an area at a contact point between the first toilet compartment 10 and the third toilet compartment 44 may serve for accommodating a stowage cabinet 46 that is adapted to the width of the first toilet door 24.

Figure 4:
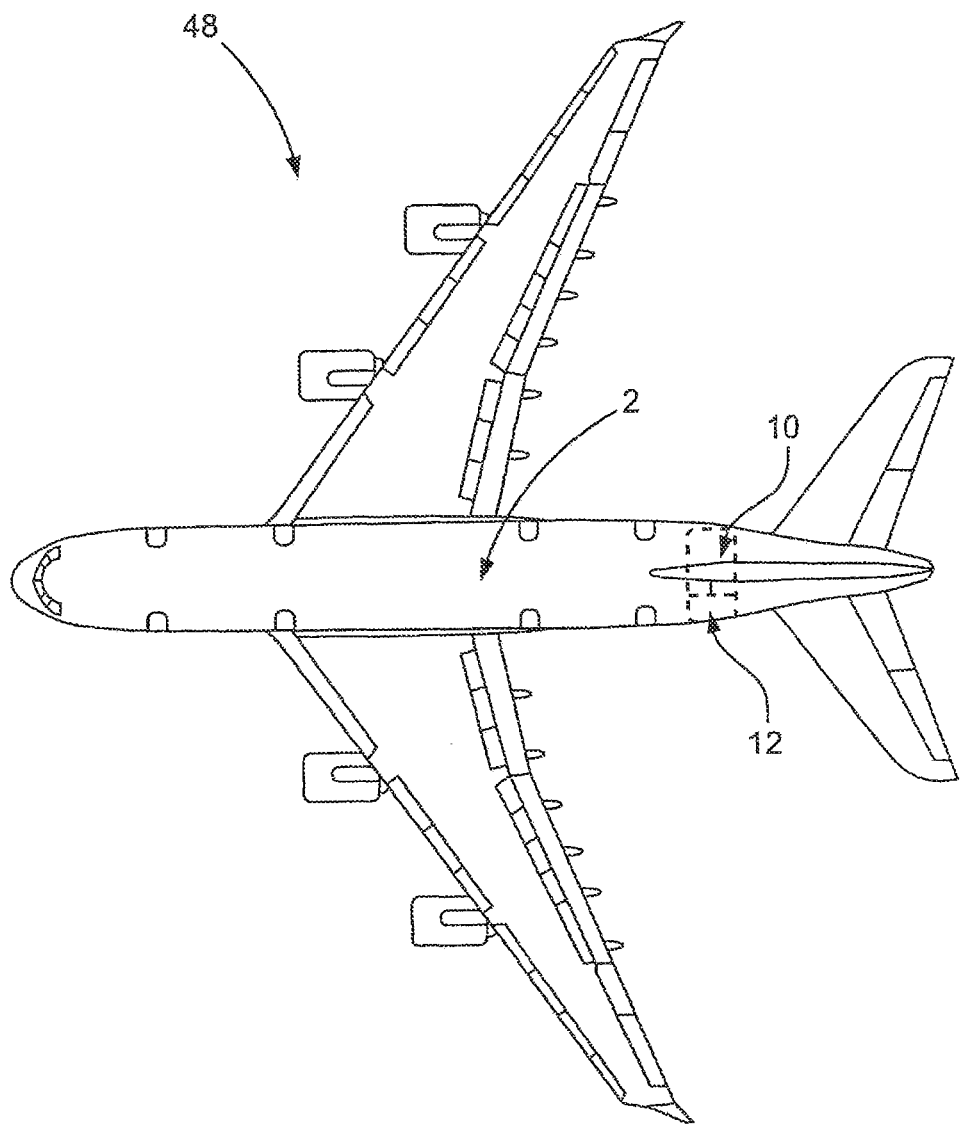
FIG. 4 shows an aircraft with at least one passenger cabin and at least one toilet arrangement according to an embodiment of the invention.

FIG. 4 ultimately shows an exemplary aircraft 48 that may comprise one or more passenger cabins 2 that may be equipped with one or more toilet arrangements according to an embodiment of the invention according to the preceding description.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

REFERENCE SYMBOLS

2 Passenger cabin
4 Partition
6 Toilet arrangement according to the invention
8 Monument
10 First toilet compartment
12 Second toilet compartment
14 Partition wall
16 Extending direction
18 Longitudinal axis
20 Extending direction
22 Pressure bulkhead
24 First toilet door 26 Second toilet door
28 First partition wall segment
30 Second partition wall segment
32 Hinge axis
34 Hinge axis
36 Hinge axis
38 Opening
40 Wheelchair
42 Common toilet compartment
44 Third toilet compartment
46 Stowage cabinet
48 Aircraft

The invention claimed is:

1. A toilet arrangement for a vehicle, comprising
a first toilet compartment having a first area;
an adjacent second toilet compartment having a second area; and
a partition wall situated between the first toilet compartment and the second toilet compartment,
wherein the partition wall is movably supported and configured for being transferred into an open position, wherein the partition between the first toilet compartment and the second toilet compartment is removed in the open position of the partition wall; and
wherein when the partition wall is transferred into an open position, an enlarged toilet compartment is formed having a third area greater than the sum of the first and second areas.

2. The toilet arrangement of claim 1, wherein the partition wall comprises first and second movably supported individual partition wall segments.

3. The toilet arrangement of claim 2, wherein the first partition wall segment is configured for being pivoted against a first sidewall of the first toilet compartment while the second partition wall segment is configured for being pivoted into an area outside the first and second toilet compartments.

4. The toilet arrangement of claim 1, wherein the direction, in which the first toilet compartment extends, and the direction, in which the second toilet compartment extends, are essentially aligned perpendicular to one another.

5. The toilet arrangement of claim 1, wherein the first toilet compartment comprises a first toilet compartment door pivotably supported about a first door hinge axis; and
wherein the first door hinge axis is spaced apart from the second toilet compartment.

6. The toilet arrangement of claim 1, further comprising a cabin monument arranged on a distant end of the first toilet compartment relative to the second toilet compartment.

7. The toilet arrangement of claim 6, wherein the cabin monument comprises a galley.

8. The toilet arrangement of claim 6, wherein the cabin monument comprises a third toilet compartment.

9. An aircraft with at least one passenger cabin and at least one toilet arrangement, the toilet arrangement comprising:
a first toilet compartment arranged in a tail area of the passenger cabin against a pressure bulkhead;
an adjacent second toilet compartment arranged in the tail area against the pressure bulkhead; and
a partition wall situated between the first toilet compartment and the second toilet compartment,
wherein the partition wall is movably supported and configured for being transferred into an open position, wherein the partition between the first toilet compartment and the second toilet compartment is removed in the open position of the partition wall.

* * * * *